United States Patent [19]

Hara et al.

[11] 4,309,078
[45] Jan. 5, 1982

[54] PENTAGONAL PRISM FOR CAMERA VIEWFINDER

[75] Inventors: Kyoichi Hara, Kawanishi; Yasuo Yamazaki, Kawachinagano; Takeshi Egawa, Osaka, all of Japan

[73] Assignee: Minolta Camera Kabushiki Kaisha, Osaka, Japan

[21] Appl. No.: 147,532

[22] Filed: May 7, 1980

[30] Foreign Application Priority Data

May 15, 1979 [JP] Japan .................... 54-59989

[51] Int. Cl.$^3$ .......................... G02B 5/04; C03C 3/10; C03C 3/30
[52] U.S. Cl. ................ 350/286; 350/276 SL; 501/61; 501/65; 501/72; 501/903
[58] Field of Search ............ 350/286, 287, 276 SL, 350/276 R, 67, 65, 50, 52; 354/225, 224, 155; 106/47 Q, 53, 54; 428/426, 433, 913; 260/37 EP

[56] References Cited

U.S. PATENT DOCUMENTS

| | | | |
|---|---|---|---|
| 1,975,141 | 10/1934 | Fitz | 350/276 SLA |
| 2,402,717 | 6/1946 | Winer | 350/67 |
| 3,030,857 | 4/1962 | Shumway | 350/50 |
| 3,954,484 | 5/1976 | Broemer et al. | 106/47 Q |
| 3,958,999 | 5/1976 | Izumitani et al. | 106/47 Q |
| 3,964,918 | 6/1976 | Hares et al. | 106/47 Q |
| 3,970,466 | 7/1976 | Faulstich | 106/47 Q |
| 4,080,216 | 3/1978 | Ishibashi et al. | 106/47 Q |
| 4,111,707 | 9/1978 | Komorita et al. | 106/47 Q |
| 4,118,238 | 10/1978 | Ishibashi et al. | 106/47 Q |
| 4,200,467 | 4/1980 | Broemer et al. | 106/47 Q |

FOREIGN PATENT DOCUMENTS 4964425 6/1974 Japan .................... 350/286

OTHER PUBLICATIONS

Dalton, R. H., ". . . Glass to Metal Joints," *Product Engineering*, Apr. 26. 1965, pp. 62–71.

*Primary Examiner*—Jon W. Henry
*Attorney, Agent, or Firm*—Jackson, Jones & Price

[57] ABSTRACT

A pentagonal prism for use in a viewfinder of a single lens reflex camera is made of a glass whose refractive index and Abbe number are not less than 1.6 and 45, respectively. Effective optical path regions on a pair of roof surfaces of the prism are left transparent so that viewfinder light can be totally reflected at both of the roof surfaces. A light absorbing paint is coated in an upper front surface, a pair of said surfaces of the prism as well as at regions other than effective optical path region of the roof surfaces, a bottom light incident surface and a rear light exit surface of the prism. The light absorbing paint prevents the occurrence of ghost images in the view field of the viewfinder. New type glasses suited for the prism are proposed.

7 Claims, 6 Drawing Figures

PENTAGONAL PRISM FOR CAMERA VIEWFINDER

BACKGROUND OF THE INVENTION

Field of the Invention

The present invention relates to a pentagonal prism for use in a single-lens reflex camera viewfinder and more particularly it relates to such a pentagonal prism which makes use of total reflection from the roof surfaces without metallic reflection treatment thereon.

Generally, a pentagonal prism for use in the viewfinder of a single-lens reflex camera includes 3 reflection surfaces, all of which are coated with metallic films for reflection. The use of aluminum coating for such metallic films results in chemical stability and low costs. Since, however, the reflection efficiency thereof is about 85%, 3 reflections each per reflection surface reduce the quantity of light to about 60%. Silver coating, if applied to the reflection surfaces, produces about 95% of reflection efficiency, and even 3 reflections reduce the quantity of light to only about 85%. In terms of chemical stability and costs, however, it is inferior to aluminum coating. If total reflection is possible on the two surfaces forming the roof surfaces of a pentagonal prism, a metallic film for reflection is required only for one surface, which will result in about 85% of total transmission factor even when aluminum is used for the metallic film, whereby performance as high as that of a prior art pentagonal prism with 3 silver-coated reflection surfaces can be obtained. Aluminum coating on one surface alone is greatly advantageous in costs. From this point of view, there has been proposed a pentagonal prism making use of total reflection on the roof surfaces in Japanese Patent Laid-Open Publicaton No. Sho 49-64425.

Total reflection on the roof surfaces of a pentagonal prism requires an angle formed by a roof ridge and a light incident (bottom) surface, i.e., angle $\alpha$ shown in FIG. 1 to be larger than an angle determined by the refractive index of glass used for the prism. However, large angle $\alpha$ increases the size of a camera viewfinder, thereby offending against recent demand for a compact design camera. It is desirable therefore to minimize angle $\alpha$ so that the light of total reflection on the roof surfaces can reach an eye viewing through a camera viewfinder so long as the eye remains at a regular position on the optical axis of the viewfinder. In this case, however, even the slightest shift of the eye causes the conditions of total reflection on the roof surfaces to be unsatisfied in the corners of a viewfinder image field, and an image therein to be dark, whereby a viewfinder image becomes greatly unstable against the shift of an eye. As a solution to such a problem, a prism may be made of glass with a large refractive index. Generally, however, such glass increases the degree of dispersion, thereby causing a viewfinder image to be colored due to chromatic aberration, posing another problem. That is, a pentagonal prism is optically equivalent to a 70 mm to 80 mm thick glass plate with a parallel plane, and chromatic aberration occurs when an object at a limited distance is viewed through such thick glass plate. In addition, the use of total reflection on roof surfaces poses a problem of ghost due to undesired light, as described later.

SUMMARY OF THE INVENTION

The principal object of the present invention is to provide a pentagonal prism using total reflection to obviate the above problems, i.e., a pentagonal prism which meets the demand for a compact design camera and which prevents a viewfinder image field from coloring and dimming in the corners as well as prevents occurrence of ghost.

To achieve the above object, the present invention provides a pentagonal prism made of glass with a refractive index of greater than or equal to 1.6 and an Abbe number of greater than or equal to 45. Furthermore, the pentagonal prism is treated to prevent light reflection at portions of the roof surfaces unnecessary for forming a viewfinder image field and at both side surfaces and top front surface thereof.

The above and other objects and features of the present invention will be more apparent from the following description taken in conjunction with the accompanying drawings.

DESCRIPTION OF THE PREFERRED EMBODIMENTS

Figure 1:
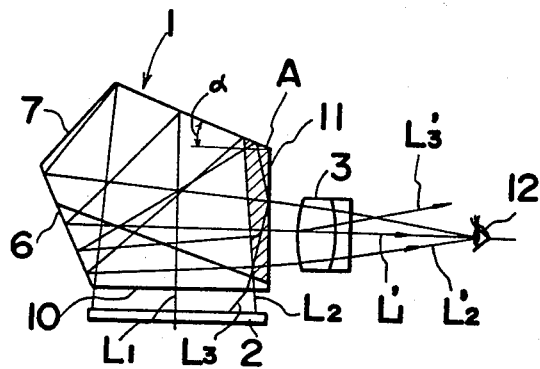
FIG. 1 is a side view of a pentagonal prism according to a first embodiment of the present invention.

Before describing the embodiments of the present invention, explanation will now be given of a ghost caused by undesired light. Shown in FIG. 1 are pentagonal prism 1, focusing plate 2, viewfinder eyepiece 8 and human eye 12. A pencil of light from L1 to L1' passes through the center of a viewfinder image field. A pencil of light L2 to L2' passes through the corner of a viewfinder image field. A pencil of light from L3 to L3' is one of the light rays causing a ghost. This last pencil of light impinges on the roof surfaces of a pentagonal prism after initially being totally reflected on light exit surface 11 thereof, and is totally reflected on the roof surfaces. The pencil of light then impinges on a lower front surface having a metallic reflection film thereon and goes out as shown by L3'. In a prior art pentagonal prism, without making use of total reflection on roof surfaces, the effective optical path regions of the roof surfaces required for forming a viewfinder image field are coated with a metallic reflection film. Thereafter a light absorbing paint is applied to the whole roof surfaces, partly to protect the metallic reflection film on the effective optical path regions and to prevent light reflection at the remaining regions of the roof surfaces. Accordingly, with FIG. 1, hatched region A subjected to the occurrence of a ghost will cause no ghost due to a light absorbing paint applied thereon. In accordance with the present invention, the use of total reflection on roof surfaces causes pencil of light L3' to be considerably intensified. Thus, a ghost would become very distinct if no light absorbing paint were applied to region A. With the present invention, neither a metallic coating nor a light absorbing paint is applied to the effective optical path regions of the roof surfaces while a light absorbing paint is applied only to the remaining of the roof surfaces. This is a difference from prior art pentagonal prisms coated with a light absorbing paint on the whole roof surfaces.

Figure 2:
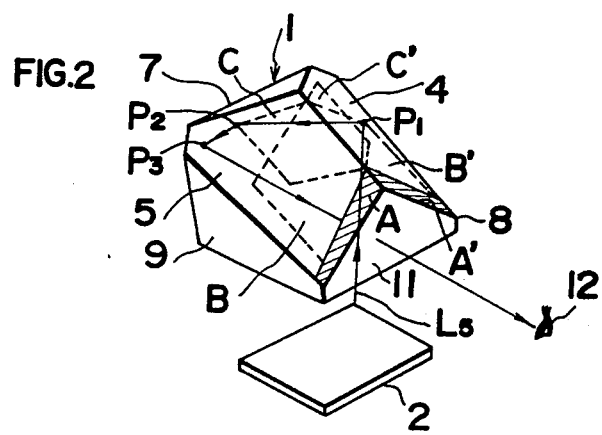
FIG. 2 is a perspective view of a pentagonal prism of the same embodiment.
Figure 4:
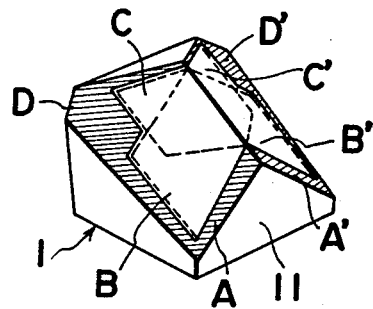
FIGS. 4, 5 and 6 are the perspective views of prisms according to further embodiments of the present invention.

Description will now be given of the present invention in accordance with the embodiments thereof. FIGS. 1 and 2 illustrate a first embodiment of the present invention. Pentagonal prism 1, focusing plate 2 and eyepiece 3 are arranged similarly to those in a prior art viewfinder optical system for use in a single-lens reflex camera. Pentagonal prism 1 is made of a glass with a refractive index nd of equal to or greater than 1.6 and an Abbe number νd of equal to or greater than 45; to be exact, SK2 (nd=1.60738,νd−56.71) or SSK1 (nd=1.61720,νd=54.00) or a new type glass described in this specification. Roof surfaces 4 and 5 of pentagonal prism 1 are transparent with rear areas A and A' black-painted for reflection prevention, such rear areas being deviated from effective optical path regions B and C as well as B' and C'. Effective optical path regions B and C are positioned to partially overlap each other on a roof surface and are formed in a complex shape as shown in FIG. 4. Effective optical path regions B and B' are regions of the roof surfaces on which effective light rays emerging from focusing plate 2 impinge first. Effective optical path regions C and C' are such regions of the roof surfaces on which the light reflected on one of the roof surfaces impinge subsequentially. The effective light rays forming a viewfinder image field is totally reflected on effective optical path regions B and B', as well as C and C'. In contrast thereto, third reflective surface 6 of pentagonal prism 1 e.g. at least an effective optical path thereof, is provided with an aluminium film (silver film may be used) vaporized thereon for permitting light rays reflection. Upper front surface 7 and side surfaces 8 and 9 of pentagonal prism 1 are entirely unrelated to the formation of a viewfinder image field and are therefore painted black over the whole regions thereof for reflection prevention. It is to be noted that incident surface 10 and light exit surface 11 of pentagonal prism 1 may be painted black for reflection prevented, except for their effective optical path regions. Similarly, third reflection surface 6 may also be painted black except for its effective optical path region.

One of the objects of the present invention is to effect total reflection on roof surfaces 4 and 5 and make the angle formed by a roof ridge and incident surface 10 (shown as in FIG. 1) smaller so that the entire prism height can be lowered. Referring to FIG. 1, a pencil of light L5 passing through a corner of focusing plate 2 is considered since it is most difficult to have this pencil of light satisfy the condition of total reflection. This pencil of light L5 is first reflected at point P1 of surface 4 and then reflected again at point P2 of surface 5. The light then impinges on point P3 of lower front surface 6 to perform a third reflection, and finally enters eye 12. A reflection angle at the first reflection point P1 is 54° to 55° which is large enough to meet the condition of total reflection. Accordingly, to ensure total reflection of pencil of light L5 at both of the roof surfaces consideration should be given to second reflection point P2. To ensure total reflection at point P2, angle α may be made larger as is well known. In addition, it is needless to say that a refractive index of a prism may be made larger. However, making angle α larger increases the height of pentagonal prism 1, thereby offending against the demand for a compact design camera. Furthermore, an increase in the refractive index of glass makes the degree of dispersion larger, thereby causing chromatic aberration to increase, as described above. Furthermore, glass with a larger refractive index is generally soft, posing a machining problem such that the ridge of the roof surfaces tends to be destroyed in the grinding and polishing processes.

Figure 3:
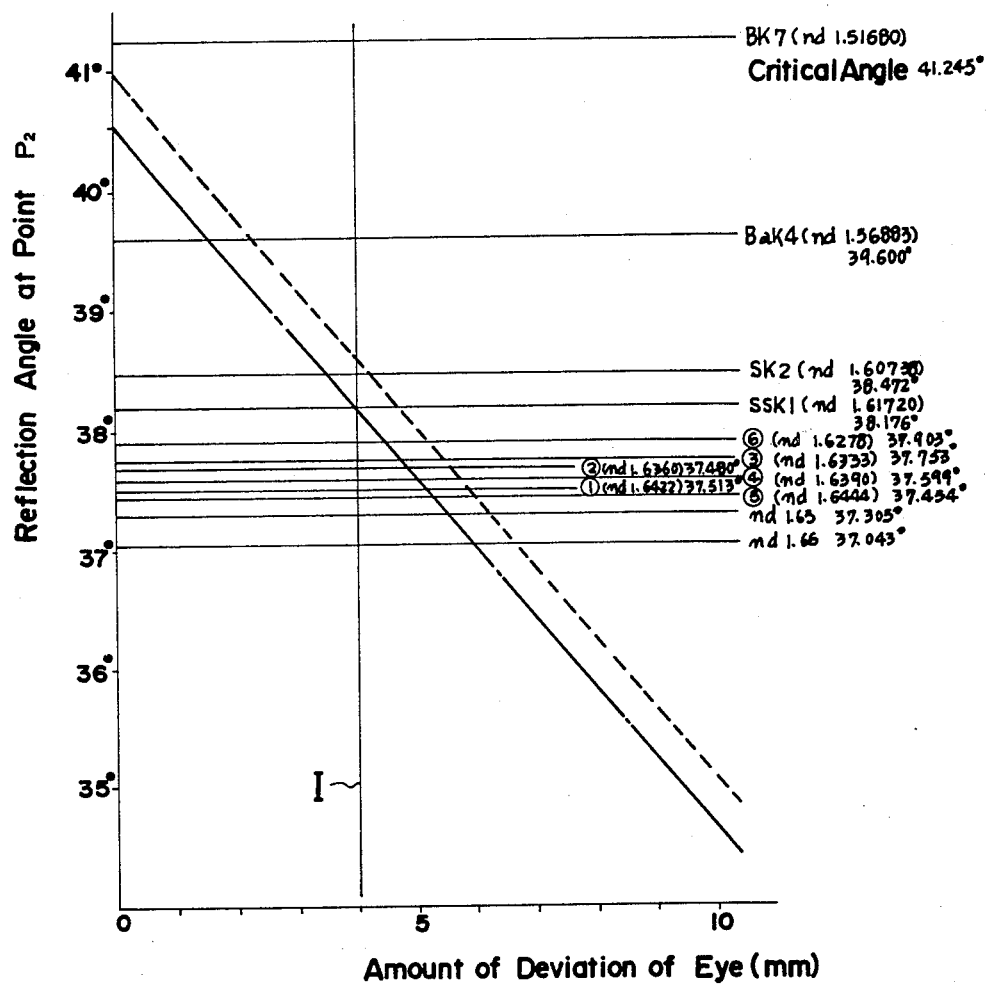
FIG. 3 is a graph showing the relations of an eye shift and a reflection angle of a second reflection surface.

Another point to be considered is the shift of an eye α looking through a viewfinder. Even a pencil of light L5 passing through a corner of focusing plate 2 is totally reflected on point P2 shown in FIG. 2, to enter eye 12 located on the optical axis of the viewfinder, the brightness in the corners of a viewfinder image field may vary with the shift of the eye, causing the viewfinder image field to be unstable. That is, if the eye shifts, from the optical axis the light coming to the eye through a corner of focusing plate 2 ceases to satisfy the condition of total reflection at point P2. Therefore, the conditions of total reflection require a certain extent of allowance. FIG. 3 is a graph where the abscissa represents an amount of shift of eye 12 (from the optical axis) and the coordinate is a reflection angle of pencil of light L5 at point P2. This graph shows how the reflection angle at point P2 changes in response to the shift of an eye with angles α=20° 50', viewfinder magnification=0.87 (standard lens with focal length of 50 mm and object distance at infinity). The dotted line represents the case where the ratio of the view area compared to the film area is 90%, and the solid line represents the case where the ratio is 95%. On the other hand, a plurality of horizontal lines indicate the critical angles of glasses having various refractive indexes. According to the graph, total reflection is not possible on point P2 in the case of BK7 which is used most widely as a pentagonal prism material at present even when the ratio of the view area to the film area is 90% and an eye is located on the optical axis of a viewfinder. To make total reflection possible, in this case, angle α must be made wider than 25°. However, angle α of more than 25° with the ratio of the view area to the film area of 90° is considered unsatisfactory in terms of making a camera compact as well as in terms of viewfinder performance. In addition, it is desirable to increase an amount of permissible eye shift in terms of easiness of viewfinder observation. On inspection, it has been found that the amount of permissible eye shift should be more than 4 mm. This means that the area on the right of line I in FIG. 3 represents a practical area for a viewfinder. Pentagonal prism 1 made of SK2 (angle α=20° 50') meets this condition with the ratio of the view area to the film area of 90%. To increase the ratio to 95%, SK2 is not sufficient and SSK1 of a larger refractive index should be used. Referring to FIG. 3, horizontal lines numbered from 1 through 6 indicate the critical angles of glass materials of new types proposed in this specification, and the use of such glasses permits eye shift of more than 5 mm with the ratio of 95% even if angle α is determined to be 20° 50'.

As is apparent from FIG. 3, the demand for an increase in the refractive index is relieved by reducing the ratio of the view area to the film area. In addition, an increase of view-finder magnification is a factor to widen the reflection angle at point P2 and to thereby facilitate total reflection. The use of a glass of a larger refractive index shortens the length of an optical equivalent path in air to thereby enlarge the viewfinder magnification. Thus, coupled with a result of making the critical angle smaller, a glass of a higher refractive index also facilitates the condition of total reflection on point P2, whereby an amount of permissible eye shift can be increased with a comparatively small angle $\alpha$.

Consideration will now given to chromatic aberration. A pentagonal prism for use in a viewfinder of a single-lens reflex camera is optically equivalent to a glass plate of parallel planes, which is 70–80 mm thick. Therefore, when glass with a smaller Abbe number d is used for a pentagonal prism, coloring of a viewfinder image field due to chromatic aberration occurs. Chromatic aberration includes longitudinal and lateral chromatic aberrations. These chromatic aberrations for various types of glasses are shown in the following table (nd denotes a refractive index):

|  | nd | $\mu$d | Longitudinal Chromatic Aberration | Lateral Chromatic Aberration |
| --- | --- | --- | --- | --- |
| BK7 | 1.51680 | 64.12 | −0.24 | 0.8' |
| SK2 | 1.60738 | 57.71 | −0.30 | −0.7' |
| SSK1 | 1.61720 | 54.00 | −0.30 | −1.1' |
| New Types of Glasses | | | | |
| (6) | 1.6278 | 53.2 | −0.30 | −1.3' |
| (3) | 1.6333 | 51.8 | −0.30 | −1.6' |
| (2) | 1.6360 | 51.2 | −0.30 | −1.8' |
| (4) | 1.6390 | 51.4 | −0.30 | −1.7' |
| (1) | 1.6422 | 51.2 | −0.30 | −1.8' |
| (5) | 1.6444 | 50.8 | −0.30 | −1.4' |

The above table indicates how lateral chromatic aberrations appear when the longitudinal chromatic aberration is set at 0.3 diopter max. BK7 is most widely used as a pentagonal prism material at present. Prisms made of the other types of glasses cause a little larger chromatic aberrations, but the difference in chromatic aberrations between BK7 and the other type of glasses cannot be recognized visibly. Assuming that nd=1.65 and $\nu$d=45 as an extreme example, then lateral chromatic aberration becomes −3.3' relative to longitudinal chromatic aberration of 0.3 diopter, and this level of chromatic aberration is a permissible limit.

Description is then given of a new type of glass suitable for use in manufacturing a pentagonal prism according to the present invention. It is characterized in chemical durability, mechanical strength suited for grinding and polishing processes and less coloring, with chemical composition listed below:

| | | |
| --- | --- | --- |
| $SiO_2$ | 40 to 44 | Weight % |
| $B_2O_3$ | 3 to 5 | " |
| $Li_2O$ | 1 to 3 | " |
| CaO | 5 to 10 | " |
| BaO + SrO | 15 to 25 | " |
| Wherein BaO | 12 to 18 | " |
| SrO | 0 to 7 | " |
| ZnO | 10 to 17 | " |
| $ZrO_2$ | 4 to 6 | " |
| $TiO_2$ | 0.5 to 4 | " |
| $Na_2O + K_2O$ | 0 to 3 | " |
| MgO | 0 to 3 | " |
| PbO | 0 to 3 | " |
| $Sb_2O_3 + As_2O_3$ | 0 to 1 | " |

With the chemical composition listed above, the $B_2O_3$ content is subject to deterioration in chemical durability and is minimized while $Li_2O$ content is increased so that high fusibility is obtained. Also, a part of CaO is replaced by ZnO to enhance chemical durability. Furthermore, a low degree of dispersion is obtained by BaO irrespective of a high refractive index. The following describes the effects of individual components and their content limits.

The basic material SiO for the glass lowers chemical durability if there is a small amount, while an excessive content thereof makes the refractive index of the glass insufficient due to the low refractive index inherent therein. $B_2O_3$, $Na_2O$ and $K_2O$ together facilitate glass fusibility. However, an excessive content of any of these components lowers chemical durability of the glass. For this reason $B_2O_3$ content is reduced and compensated for by $Li_2O$. PbO and MgO are used to adjust the refractive index of the glass. ZnO is used to increase chemical durability and mechanical strength of the glass. TiO is effective to enhance a refractive index of the glass. Furthermore, the effects and content limits thereof are quantitatively described. The chemical durability of the glass deteriorates when SiO is less than 40%, while a necessary refractive index cannot be obtained when SiO is more than 44%. Less than 3% of $B_2O_3$ makes the glass infusible while more than 5% causes chemical durability to deteriorate. $Li_2O$ is effective for use as a flux for glasses containing less $B_2O_3$, but less than 1% of $Li_2O$ is ineffective while more than 3% causes chemical durability to deteriorate. CaO enhances chemical durability but is ineffective if less than 5% while the transparency of the glass is degraded if more than 10%.

BaO increases the refractive index of the glass but lowers a degree of dispersion thereof. SrO slightly degrades glass transparency but enhances chemical durability and mechanical strength, and therefore its, combined use with BaO is very effective. However, a necessary refractive index cannot be obtained when the total content is more than 25%. In addition, less than 12% of BaO causes the refractive index to deteriorate, while more than 18% causes chemical durability to deteriorate. Therefore, SrO is required to be within the range of 0 to 7% of the total content with BaO not exceeding 25%.

ZnO is indispensable for enhanced chemical durability and mechanical strength of the glass. However, less than 12% of ZnO content is ineffective while more than 17% degrades transparency. $ZrO_2$ enhances chemical durability and is required to be more than 4% but more than 6% makes glass infusible. TiO is very useful since it enhances the refractive index and chemical durability of the glass but 0.5% or less is ineffective while an increased content colors the glass, and therefore, it is desirable that TiO is no greater than 4%. $Na_2O$ and $K_2O$ are effective for use as fluxes when SiO content is high. However, more than 3% of their content causes chemical durability to deteriorate.

MgO and PbO are usable for adjusting a refractive index without affecting chemical durability and mechanical strength if their content is less than 3%. $Sb_2O_3$ and $As_2O_3$ are effective for use as refining agents with their content of less than 1% being sufficient.

The glass of the above listed composition is melted by use of a melting pot made of platinum in accordance with the melting method for ordinary optical glasses. However, continuous melting by use of a small tank is also possible. Molding, gradual cooling and after-processing of the glass are also possible in a similar manner to ordinary optical glasses.

The following table shows 6 embodiments according to the present invention:

|  | 1 | 2 | 3 | 4 | 5 | 6 |
|---|---|---|---|---|---|---|
| $SiO_2$ | 42.0 | 43.0 | 43.0 | 42.7 | 42.2 | 43.5 |
| $B_2O_3$ | 4.0 | 3.0 | 4.0 | 4.0 | 4.0 | 4.5 |
| $Li_2O$ | 2.0 | 2.0 | 2.0 | 2.0 | 2.0 | 2.0 |
| CaO | 7.0 | 9.0 | 7.0 | 6.9 | 8.0 | 7.0 |
| BaO | 17.5 | 15.5 | 14.0 | 15.4 | 16.3 | 15.0 |
| SrO | 6.0 | 6.0 | 5.0 | 6.0 | 7.0 | 6.0 |
| ZnO | 15.0 | 13.0 | 16.0 | 15.0 | 14.0 | 16.0 |
| $ZrO_2$ | 5.0 | 5.0 | 5.0 | 5.5 | 4.5 | 4.5 |
| $TiO_2$ | 1.5 | 1.5 | 1.0 | 0.5 | 2.0 | 0.5 |
| $Na_2O$ |  |  | 1.0 |  |  |  |
| $K_2O$ |  | 2.0 |  |  |  | 1.0 |
| MgO |  |  | 2.0 |  |  |  |
| PbO |  |  |  |  | 2.0 |  |
| $Sb_2O_3$ |  | 0.5 |  |  |  |  |
| $As_2O_3$ | 0.3 |  | 0.3 | 0.3 | 0.3 | 0.3 |
| Nd | 1.6422 | 1.6360 | 1.6333 | 1.6390 | 1.6444 | 1.6278 |
| νd | 51.2 | 51.2 | 51.3 | 51.4 | 50.8 | 53.2 |

Figure 5:
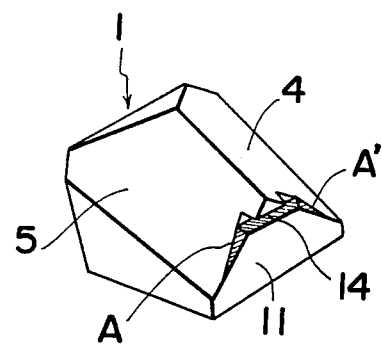
Figure 6:
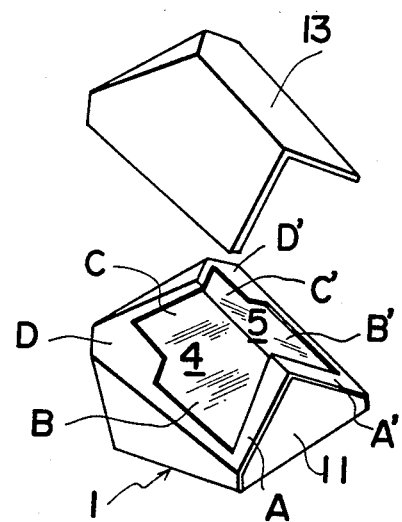

Description is hereby given of ghost images prevention. The causes and prevention of ghost images are briefly described at the beginning. In the embodiment shown in FIGS. 1 and 2, hatched regions A and A' are coated with a light absorbing paint for reflection prevention. Referring to FIG. 4 which shows another embodiment of the present invention, regions A and A', D and D' except for effective optical path regions B and B' and C and C' on the roof surfaces are painted black for reflection prevention, whereby a ghost produced by any light other than pencil of lights L3 in FIG. 1 is prevented. With the embodiment of FIG. 5, groove 14 is provided above the effective optical path region of light exit surface 11 and painted black inside thereof so that pencil of lights L3 in FIG. 1 is shielded before it impinges on roof surfaces 4 and 5. Furthermore, an area outside both ends of groove 14 corresponding to regions A and A' in FIGS. 1 and 2 are painted black (hatched portions). The embodiment in FIG. 6 is a modification of that in FIG. 4. In view of the black painted regions A and A' as well as D and D' being about 10 to 100μ thick, protection cover 13 is stuck on the black painted film so as to protect the entire roof surfaces 4 and 5 without adversely affecting the total reflection function on effective optical path regions B and B' as well as C and C' of roof surfaces 4 and 5. In greater detail, black paint is used as a spacer between protection cover 13 and roof surfaces 4 and 5 and also as a bonding agent between them. Thus, aerial gaps are formed between the roof surfaces and protection cover 13 inside effective optical path regions B and B' and C and C' on the roof surfaces, wherein total reflection on these regions is ensured.

Black paint can be sprayed with portions to be painted on the surface of pentagonal prism 1 exposed and all other glass surfaces covered with masking plates. Silk screen processing or black paint vaporization can be employed. With a pentagonal prism presently used for a single-lens reflex camera viewfinder, roof surfaces 4 and 5 are metal-vaporized for reflection and the reflection film thereof is generally coated for protection. In this case, careful consideration is necessary in selecting paints and painting methods so that metal-vaporized surfaces cannot be damaged. According to the present invention, however, painting is applied directly to glass surfaces, thereby requiring no such consideration. In addition, Chinese Ink which is low-priced and easy-to-handle is usable for painting.

The pentagonal prism according to the present invention uses glass with a refractive index of equal to or greater than 1.6 and an Abbe number of equal to or greater than 45, thereby enabling total reflection on the roof surfaces with a comparatively small angle α formed by the roof ridge and a horizontal line. This not only meets the demand for a compact design camera but also ensures free movement of an eye as it views through a viewfinder, whereby a viewfinder provides a bright image with stable brightness in the corners in its image field for use in a single-lens reflex camera. In addition, the glass material in use is high in chemical durability and mechanical strength so that ridges on roof surfaces are preserved from destruction, thereby requiring no special processing method for pentagonal prism manufacturing.

What is claimed is:

1. A pentagonal prism for use in a camera viewfinder, said prism being made of a glass whose refractive index and Abbe number are not less than 1.6 and 45 respectively, and said prism comprising a pair of roof surfaces which have their effective optical regions left transparent, whereby viewfinder light travelling through said prism can be totally reflected at both of said roof surfaces, wherein said glass is of the following composition in weight %:

| | |
|---|---|
| $SiO_2$ | 40 to 44% |
| $B_2O_3$ | 3 to 5% |
| $Li_2O$ | 1 to 3% |
| CaO | 5 to 10% |
| BaO + SrO | 15 to 18% |
| wherein BaO | 12 to 18% |
| SrO | 0 to 7% |
| ZnO | 10 to 17% |
| $ZnO_2$ | 4 to 6% |
| $TiO_2$ | 0.5 to 4% |
| $Na_2O + K_2O$ | 0 to 3% |
| MgO | 0 to 3% |
| PbO | 0 to 3% |
| $Sb_2O_3 + As_2O_3$ | 0 to 1% |

2. An improved pentagonal prism for use in a camera viewfinder to provide a bright image for a viewer comprising:

a prism having a pair of roof surfaces respectively forming angles greater than the critical angle to an optical axis for total reflection of light and at least a third surface to reflect light to a viewer, the prism formed of a glass having an index of refraction in the range of 1.62 to 1.65 and an Abbe number in the range of 51 to 54 wherein the composition of the glass by weight includes 3% to 5% $B_2O_3$, 1% to 3% $Li_2O$, 5% to 10% CaO, 12% to 18% BaO, 0% to 7% SrO, 10% to 17% ZnO, 4% to 6% $ZnO_2$, and 0.5% to 4% $TiO_2$.

3. A pentagonal prism as defined in claim 2, wherein said roof surfaces have their regions other than said effective optical regions coated with a paint for prevention of light reflection.

4. A pentagonal prism as defined in claim 3, further comprising a bottom light incident surface, a rear light exit surface, upper and lower front surfaces and a pair of said surfaces, wherein said upper front surface and said side surfaces are coated with a paint for prevention of light reflection.

5. A pentagonal prism as defined in claim 4, wherein said lower front surface has its effective optical path region coated with a metallic film so as to be reflective, whereby viewfinder lights passing through said bottom light incident surface are reflected at said effective optical region of said lower front surface to be directed to said rear light exit surface after totally reflected at said effective optical regions of said roof surfaces.

6. A pentagonal prism as defined in claim 5, wherein said lower front surface has its regions other than said effective optical path region coated with a paint for prevention of light reflection.

7. A pentagonal prism as defined in claim 6, wherein said bottom light incident surface and said rear light exit surface have their regions other than their effective optical path region coated with a paint for prevention of light reflection.

* * * * *